Figure 1:
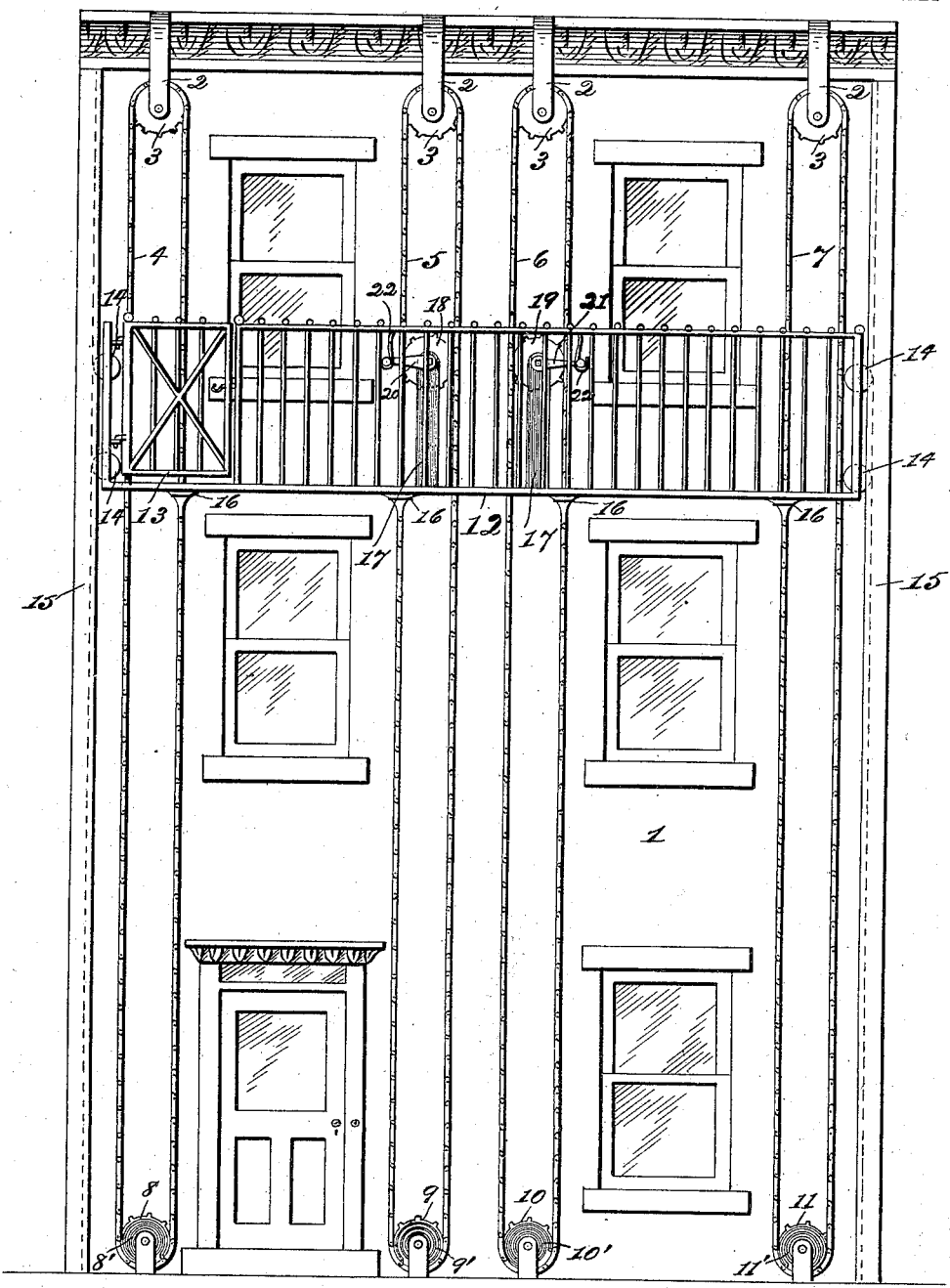

No. 726,592. PATENTED APR. 28, 1903.
B. TENENBOM.
FIRE ESCAPE.
APPLICATION FILED SEPT. 18, 1902.
NO MODEL. 2 SHEETS—SHEET 1.

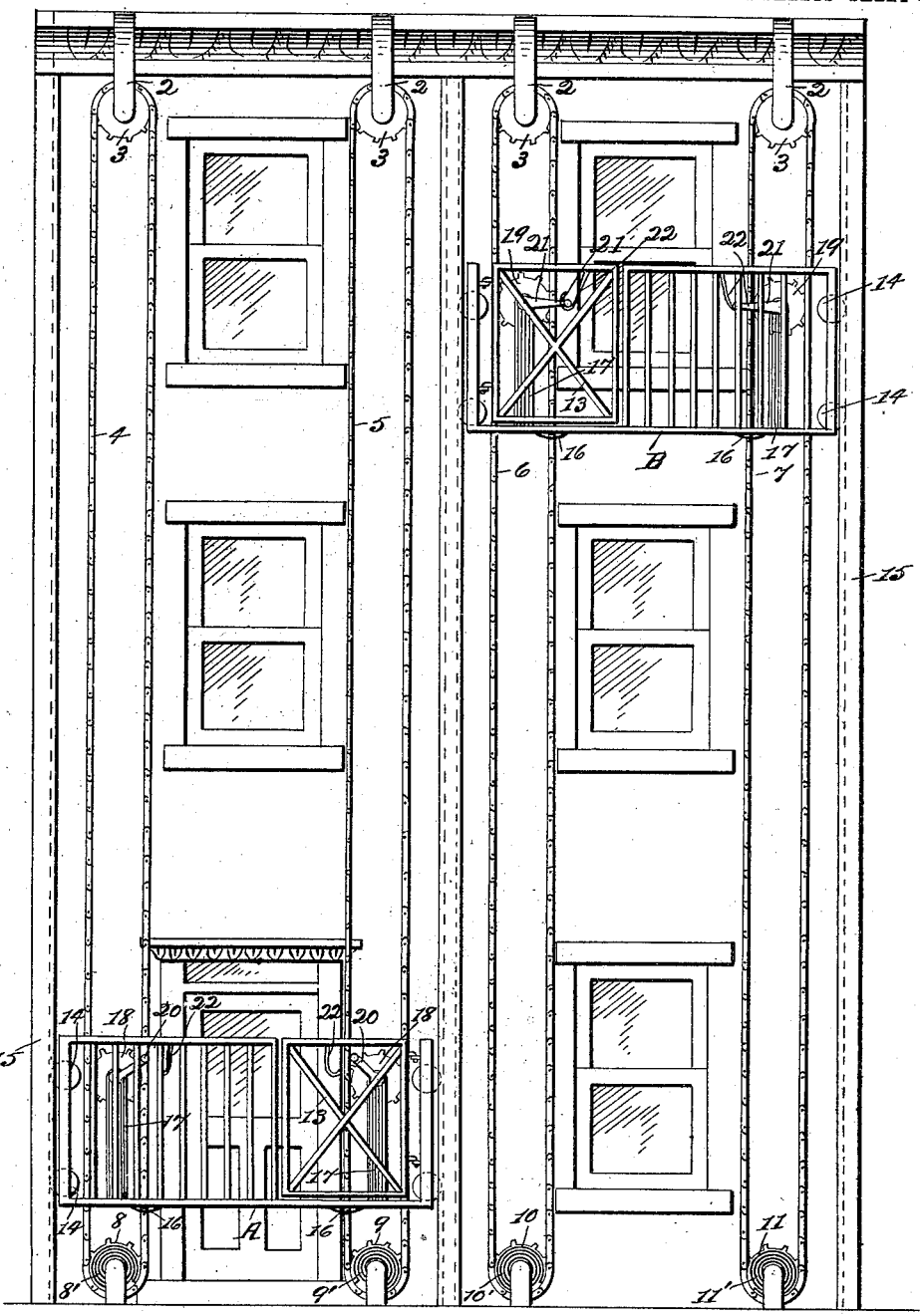

UNITED STATES PATENT OFFICE.

BENJAMIN TENENBOM, OF WASHINGTON, DISTRICT OF COLUMBIA, ASSIGNOR OF ONE-HALF TO DAVIS GOLDMAN, OF WASHINGTON, DISTRICT OF COLUMBIA.

FIRE-ESCAPE.

SPECIFICATION forming part of Letters Patent No. 726,592, dated April 28, 1903.

Application filed September 18, 1902. Serial No. 123,889. (No model.)

*To all whom it may concern:*

Be it known that I, BENJAMIN TENENBOM, a citizen of the United States, residing at Washington, in the District of Columbia, have invented certain new and useful Improvements in Fire-Escapes; and I do hereby declare the following to be a full, clear, and exact description of the invention, such as will enable others skilled in the art to which it appertains to make and use the same.

My invention relates to "fire-escapes," and has for its object to provide a device of this character which is cheap to manufacture, simple in its construction, and composed of a minimum number of parts.

A further object of my invention is to provide a fire-escape which is automatic in its operation, yet which may be operated manually, if desired.

With these objects in view my invention consists in the novel arrangement of a fire-escape and also in certain other novel features of construction and in combination of parts which will be hereinafter fully described and afterward specifically pointed out in the appended claim.

Referring to the accompanying drawings, Figure 1 is an elevation of a fire-escape constructed in accordance with my invention. Fig. 2 is a plan view of a slightly-modified construction.

Like characters of reference indicate the same parts throughout both figures, in which—

1 is a house provided at its roof with the hangers 2, within which are journaled the sprocket-wheels 3. On said sprocket-wheels I provide the endless chains 4, 5, 6, and 7. Said chains also run on sprocket-wheels 8, 9, 10, and 11, located at the bottom of the house and secured in any approved manner.

12 indicates the car, provided with a gate 13, and on the ends of said car I provide guide-rollers 14, which travel in a track 15 for the purpose of guiding the car. Each of the endless chains is secured to the floor of the car at 16, and I provide uprights 17 on the car-floor, in which I journal sprocket-wheels 18 and 19, the shafts of said wheels being provided with cranks 20 and 21. A catch 22 is provided on the side of the car to engage the cranks 20 and 21 in order to keep said wheels from turning when the escape is not in use. It will be noticed by referring to the drawings that said sprocket-wheels are located between the chains and prevent said chains from moving when said wheels are locked, as just described.

In the lower sprocket-wheels 8, 9, 10, and 11 I provide spiral springs 8', 9', 10', and 11', said springs in Fig. 1 being arranged so that when the car is lowered by turning the cranks in said car said springs are wound up by reason of the turning of the lower sprocket-wheels. In Fig. 2, however, I divide the car into two sections A and B, and the springs 8' and 9' are so arranged that they wind up when the section A is raised, which is accomplished by turning the cranks 20. The springs in the sprockets 10 and 11 are arranged so that they are wound up when the section B is lowered, which is accomplished either by turning the cranks 21 or by weight of persons in the car-section B.

Having thus described the several parts of my invention, its operation is as follows: As aforesaid, the springs in the lower sprocket-wheels, Fig. 1, are of sufficient strength to hold the car, which is constructed with a view to lightness, normally at the top of the building, as shown in Fig. 1, where the cranks 20 and 21 are locked, as described, thus securely holding the car in the desired position. In case of fire the occupants of the building enter the car, release said cranks, and immediately descend rapidly, but not too fast, as the descent of the car winds up the spring in the lower sprocket-wheels, the force of said winding preventing the car from a swift descent. However, the velocity of the car can be controlled by the cranks 20 and 21 and can be made to go fast or slow or may be stopped altogether in order to take on passengers in its descent. The car having reached the ground and discharged its passengers, the big springs in the lower sprocket-wheels immediately start to unwind just as soon as the car is relieved of the weight of its occupants, and the car is thus carried up to the top of the building empty to take on another load and descend, as described, until every one is out of the building.

It is obvious that were it not for the automatic ascending of the car all escape would be cut off from those persons left on the upper floors after the car had made its first descent.

The operation of Fig. 2 is substantially the same as that described except that it provides for one more emergency. The springs controlling the two car-sections A and B are oppositely wound and normally tend to hold the section B at the top of the building and the section A at the bottom. In other words, the springs controlling section B will cause said section to ascend, while the springs controlling section A will cause it to descend. The object of this construction is as follows: It is possible when the car ascends to the top of the building that every one on the top floor has safely escaped, while there are still occupants on the intermediate floors. In this event the car is out of reach, being above them. The section A, however, after its first descent remains at the bottom of the building, and as soon as it is ascertained that there are persons who cannot reach the section B section A is promptly raised to the desired floor manually by means of the cranks 20, and thus rescue those who would otherwise perish.

Having thus specifically described my invention, I do not wish to be understood as limiting myself to the exact construction herein set forth, as various slight changes might be made therein which would fall within the limit and scope of my invention, and I consider myself clearly entitled to all such changes in form and construction.

What I claim as new, and desire to secure by Letters Patent of the United States, is—

In a fire-escape, the combination with an endless chain, of a sprocket at the top thereof, a sprocket at the bottom thereof, a spring in the said bottom sprocket, a car and floor therefor, means for permanently securing one point of said endless chain to said floor, a sprocket-wheel mounted in said car, adapted to engage said endless chain, and to operate the same to raise or to lower the car, said endless chain supporting the car, and furnishing the raising and lowering means therefor, tracks on either side of said car, and guide-wheels on said car to travel in said tracks, substantially as described.

In testimony whereof I affix my signature in presence of two witnesses.

BENJAMIN TENENBOM.

Witnesses:
WM. I. EVANS,
C. HUGH DUFFY.